United States Patent Office 3,461,076
Patented Aug. 12, 1969

3,461,076
PROCESS FOR PREPARING PLUTONIA AQUASOLS
Milton H. Lloyd and Richard G. Haire, Oak Ridge, Tenn., assignors to the United States of America as represented by the United States Atomic Energy Commission
No Drawing. Filed Oct. 3, 1968, Ser. No. 764,958
Int. Cl. B01j 13/00; G21c 1/00; C01g 56/00
U.S. Cl. 252—301.1                              3 Claims

ABSTRACT OF THE DISCLOSURE

An improved method for preparing plutonia aquasols is provided comprising the step of aging a washed alkaline precipitated plutonium (IV) hydroxide precipitate in an aqueous medium for a period of about 2 hours at 95° C. prior to peptization.

Background of the invention

This invention relates generally to sol-gel processes for preparing nuclear fuels and more particularly to an improved process for preparing stable plutonia aquasols. The invention described herein was made in the course of, or under, a contract with the U.S. Atomic Energy Commission.

Stable plutonia aquasols have heretofore been prepared according to the process described in U.S. Patent 3,310,386. There the process, briefly, comprised the steps of (1) rapidly precipitating plutonium hydroxide from a nitric acid solution of plutonium (IV) by a strong base, (2) washing the plutonium (IV) precipitate, (3) dispersing the precipitate in dilute nitric acid at 60–80° C. to form a first sol, (4) evaporating the first sol to dryness, (5) heating the dried solid below 200° C. to reduce the nitrate content to 0.4–0.1 mole per mole of plutonium, and (6) redispersing the solid in water to form a low-nitrate plutonia aquasol. While this process was generally quite successful in the preparation of plutonia aquasols it was sensitive to minor process variables, such as electrolyte concentration in either the precipitation or peptization step, and as such was not reliable in scaled up operations. Where, for example, the first (high nitrate) sol was prepared from plutonium feed solutions containing high nitrate (i.e., above 2 molar) the final low nitrate sol showed solid separation and presented problems in the subsequent formation of microspheres. Spectrophotometric analysis of high nitrate sols at various stages of evaporation prepared by this process indicated that difficulties in preparing these sols may have been the result of depolymerization of plutonium (IV) species. It is therefore desirable to provide a stabilizing step for reducing the sensitivity of the process to plutonium (IV) depolymerization.

Summary of the invention

This object is achieved by the discovery that aging the washed alkaline precipitated plutonium (IV) hydroxide in an aqueous medium for a period of 2 hours at about 95° C. prior to peptization provides a solid which is more resistant to depolymerization to ionic forms. This solid, in turn, is readily formed into a highly uniform and stable plutonia aquasol by conventional sol-gel techniques which is less sensitive to process variables. These plutonia aquasols have plutonium concentrations of 1 to 3 M, nitrate/plutonium ratios of 0.1 to 0.15, and crystallite aggregate sizes which are primarily <500 angstroms. Such sols show little tendency to settle upon standing for many months.

Description of the preferred embodiments

The plutonium (IV) hydroxide precipitate is prepared by conventional sol-gel methods; namely, by adding a plutonium (IV) nitrate solution to a 100 percent stoichiometric excess of a strong base. The term "plutonium hydroxide" as hereinafter employed will be understood to include the term "hydrous oxide." Any strong base which does not introduce any ions which are difficult to remove in subsequent steps may be used. For this, ammonium hydroxide has been found to be highly suitable and is preferred; suitable concentrations comprise from 2–4 M ammonium hydroxide. The precipitation is conducted in this manner, i.e., slow addition with agitation of dilute plutonium (IV) nitrate solution to a large excess of base, in order to optimize the formation of suitable plutonium polymer. The plutonium (IV) nitrate concentration may vary over a fairly broad range consistent with minimization of the hereinbefore mentioned polymerization and also disproportionation of plutonium during storage. Accordingly, a plutonium (IV) nitrate solution comprising 10–130 grams of plutonium (IV) nitrate per liter in 1–2 M nitric acid is quite suitable.

Following precipitation the plutonium (IV) hydroxide precipitate is filtered and washed with water to remove ammonium nitrate. Multiple water washes with dewatering without drying may be employed until the washings show a pH within the range of 6 to 8. Air drying should be avoided in this step so as to avoid forming a nondispersible solid.

The plutonium (IV) hydroxide precipitate is then transferred to a reflux vessel and formed into an aqueous slurry. Although boiling water is quite satisfactory as the aging medium, other mediums, such as alkaline or neutral salt aqueous solutions, may be equally employed. While applicants do not wish to be bound by a rigid theory of the invention it is believed that aging of the plutonium (IV) hydroxide precipitate in an aqueous medium produces a highly crystalline polymer which is more resistant to depolymerization in subsequent process steps and which results in more ordered crystallite growth during the further denitration-by-baking steps. This latter effect results in an improved final product sol with respect to uniformity, particle size, and stability. Whereas in the presence of this aging step a highly crystalline polymer is produced, applicants have found that in the absence of such a step a largely amorphous material is formed which probably is more easily depolymerized to ionic, noncolloidal plutonium forms which tend to form large aggregates during the subsequent thermal denitration. Both of these latter effects lead to process losses of 5–20%, and marginal stability during storage. A suitable plutonium concentration is about 25 grams per liter of water or dilute ammonium hydroxide (pH~10). The slurry is slowly refluxed for about 2 hours at a temperature of about 95° C. Temperatures below the boiling point are beneficial but require longer aging times. Sols can be noticably improved by long-term aging at room temperature or short aging periods (<2 hours) at reflux; however, 2 hours at 95° C. appears to be optimum. Longer aging times at 95° C. can be used but the benefit derived is marginal.

Peptization of the refluxed slurry is next effected by adding nitric acid to the slurry, preferably in the mole ratio of 1.0–2.5 moles of nitric acid per mole of plutonium. This provides a high nitrate sol which can then be processed into the stable low nitrate plutonia aquasol generally according to the prior art process; namely, evaporating the high nitrate plutonium sol to dryness, heating the dried solid at 200–250° C. to reduce the nitrate content to a ratio of 0.15–0.1 mole per mole of plutonium and redispersing the solid in water (one liter of water per 1–3 moles of plutonium) with stirring. This low nitrate plutonia aquasol can be prepared either into tubular elements via vibratory compaction of dried gel fragments or into microspheres by the process described in U.S. Patent No. 3,290,122, in the names of Sam D. Clinton et al., for "Process and Apparatus for Preparing Oxide Gel Microspheres from Sols."

Having described the present invention in general terms the following example is given to illustrate with greater particularity the particular process parameters and techniques.

Example

About 165 ml. of plutonium nitrate stock solution which contains 0.27 M plutonium and 1.5 M nitric acid was added slowly to 330 ml. of 2.3 M ammonium hydroxide with rapid agitation. The precipitate was filtered and washed with water until the pH the filtrate was 8 or less. The filter cake was slurried in approximately 400 ml. of water, transferred to a round bottom flask, and refluxed for 2 hours at the boiling point ($\sim$95° C.). Concentrated nitric acid (6.3 ml. was slowly added to the boiling solution, and refluxing was continued until a dark emerald green colloidal solution was obtained ($\sim$15 min.). This solution was evaporated under vacuum at the boiling point (80° C.) to a volume of about 10 ml.

This solution was transferred to a flat bottom stainless steel baking dish and slowly evaporated to dryness at atmospheric pressure. The baker was maintained at 120° C. during this evaporation. When the solids were dry the temperature of the baker was rapidly increased (10 to 15 min.).to 240° ±5° C. The solids were baked 4 hours at this temperature with periodic mixing at $\sim$30 min. intervals.

The hot solids were dispersed with agitation in $\sim$100 ml. of water and then evaporated to $\sim$25 ml. The resultant colloid was 1.6 M in plutonium and the nitrate/plutonium mole ratio was 0.11.

Sols of this type are translucent dark green which is indicative of very small particle size, and they are extremely stable on standing. Conversion yields are 99 to 100%. Such sols are readily converted to microspheres of desirable characteristics. This procedure has been scaled up in pilot plant equipment, and successfully used to prepare numerous sols in batch sizes which contain 150 g. of plutonium.

The prior procedure for preparing plutonia sol is identical to the above except that the aging at reflux is omitted, that is, the 6.3 ml. of concentrated nitric acid is added to the slurry immediately after transfer to the reflux flasks. These sols are opaque and light green in color which is due to undesirable aggregation of crystallites. This results in some process losses (5 to 10% in the best case) and requires agitation of the sol during storage to prevent partial settling.

What is claimed is:

1. In a process for preparing stable plutonia aquasols by precipitation-peptization of an alkaline precipitated plutonium (IV) hydroxide solid the improvement comprising the step of aging the washed plutonium (IV) hydroxide precipitate in an aqueous medium at a temperature of about 95° C. for a period of time of about 2 hours prior to conducting said peptization step.

2. The method of claim 1 wherein said plutonium (IV) hydroxide solid is prepared by rapidly adding a plutonium (IV) nitrate solution comprising 10–130 grams of plutonium nitrate per liter of 1–2 M nitric acid to a 2–4 M ammonium hydroxide solution.

3. The method of claim 1 wherein said aqueous medium comprises a water slurry containing about 25 grams plutonium per liter of water or dilute ammonium hydroxide.

References Cited

UNITED STATES PATENTS

| 3,310,386 | 3/1967 | Lloyd | 252—301.1 X |
| 3,312,631 | 4/1967 | Smith | 252—301.1 |
| 3,312,632 | 4/1967 | Smith | 252—301.1 |
| 3,327,027 | 6/1967 | St. Pierre | 252—301.1 X |
| 3,331,898 | 7/1967 | Haas et al. | 252—301.1 X |
| 3,345,437 | 10/1967 | Flack et al. | 252—301.1 X |
| 3,384,687 | 5/1968 | Flack et al. | 252—301.1 X |

CARL D. QUARFORTH, Primary Examiner

S. J. LECHERT, Assistant Examiner

U.S. Cl. X.R.

23—344